June 13, 1967 K. EHRMANN ET AL 3,325,582

ARRANGEMENT FOR SUPPORTING AND FOR CONDUCTING HEAT AWAY FROM A SEMICONDUCTOR ELEMENT IN A CAPSULE OF ELECTRICALLY CONDUCTIVE MATERIAL

Filed Aug. 24, 1965

INVENTORS
Karl Ehrmann
Gerhard Söhner by Michael J. Striker
Attorney 3,325,582
Patented June 13, 1967

3,325,582

ARRANGEMENT FOR SUPPORTING AND FOR CONDUCTING HEAT AWAY FROM A SEMI-CONDUCTOR ELEMENT IN A CAPSULE OF ELECTRICALLY CONDUCTIVE MATERIAL

Karl Ehrmann, Stuttgart, and Gerhard Söhner, Geradstetten, Germany, assignors to Robert Bosch G.m.b.H., Stuttgart, Germany Filed Aug. 24, 1965, Ser. No. 482,186
Claims priority, application Germany, Aug. 27, 1964, B 78,288
14 Claims. (Cl. 174—15)

The present invention relates to an arrangement for supporting and for conducting heat away from a semi-conductor element, especially from a transistor for the ignition circuit of a combustion engine, housed in a capsule of electrically conductive material on a support element which is likewise formed from electrically conductive material and which has a potential difference with respect to the capsule.

Considerable heat is developed on the collector of a semi-conductor element or transistor during operation thereof. In order to assure the proper function of the semi-conductor and the circuit controlled thereby, the heat developed during operation thereof has to be properly dissipated. One has therefore the electrode system of the transistor, which includes a base, an emitter, and a collector, surrounded by a heat conductive metal capsule, with the conductors for the base, the emitter and the collector projecting therefrom in an insulted manner. Since the metal capsule, in order to cool the collector, is in direct contact with the latter, and has therefore the collector potential, a separate insulated collector connection is sometimes omitted and the capsule itself used as connector. In any case it is necessary to mount the capsule of the semi-conductor on a grounded support element which supports the capsule and serves also for conducting heat therefrom in such a manner that the capsule is properly electrically insulated from the support element, while at the same time a good heat transmission between capsule and support element is assured.

This problem arises especially in transistorized ignition circuits for combustion engines of motor vehicles in which the various elements are subjected already during the operation of the motor to considerable heat and in which the transistorized circuit is operated during considerable time.

It is known to mount the capsule of the transistor by means of screws on a support element and to sandwich a sheet of mica between the capsule and the support element. Experience, however, has shown that the sheet of mica, which in order to assure a proper heat transmission between capsule and support element has to be relatively thin, is easily destroyed especially in the region of the screws, which, since the damage will not aways immediately be noticed, will lead to operating troubles, and finally to a complete breakdown of the circuit. In addition, the assembly of the fragile mica sheet with the other components requires a considerable expenditure of labor and time.

It is an object of the present invention to overcome the difficulties encountered in a mounting arrangement of the aforementioned type.

It is an additional object of the present invention to provide for a mounting arrangement for a capsule of a semi-conductor or transistor on a support element serving to support the capsule and for conducting heat away therefrom in which on the other hand, the capsule is perfectly electrically insulated from the support element, and on the other hand a good heat transmission between capsule and support element is assured.

It is a further object of the present invention to provide for such a mounting arrangement which can be manufactured with a minimum of expenditure of labor and time.

With these objects in view, the arrangement of the present invention mainly comprises a semi-conductor, a capsule of electrically conductive material housing the semi-conductor, a support element of electrically conductive material having a potential difference with respect to the capsule for supporting the latter and for conducting heat away therefrom, and means for securing the capsule to the support element and comprising a plurality of spacer members of electrically insulating material sandwiched between the capsule and the support element and an electrically insulating adhesive connecting the spacer members to the capsule and to the support element.

Preferably, the spacer members are in the form of thread like, and/or net like, and/or annular elements from plastic material, whereas the adhesive is preferably a synthetic resin.

The novel features which are considered as characteristic for the invention are set forth in particular in the appended claims. The invention itself, however, both as to its construction and is method of operation, together with additional objects and advantages thereof, will be best understood from the following description of specific embodiments when read in connection with the accompanying drawings, in which:

Figure 1:
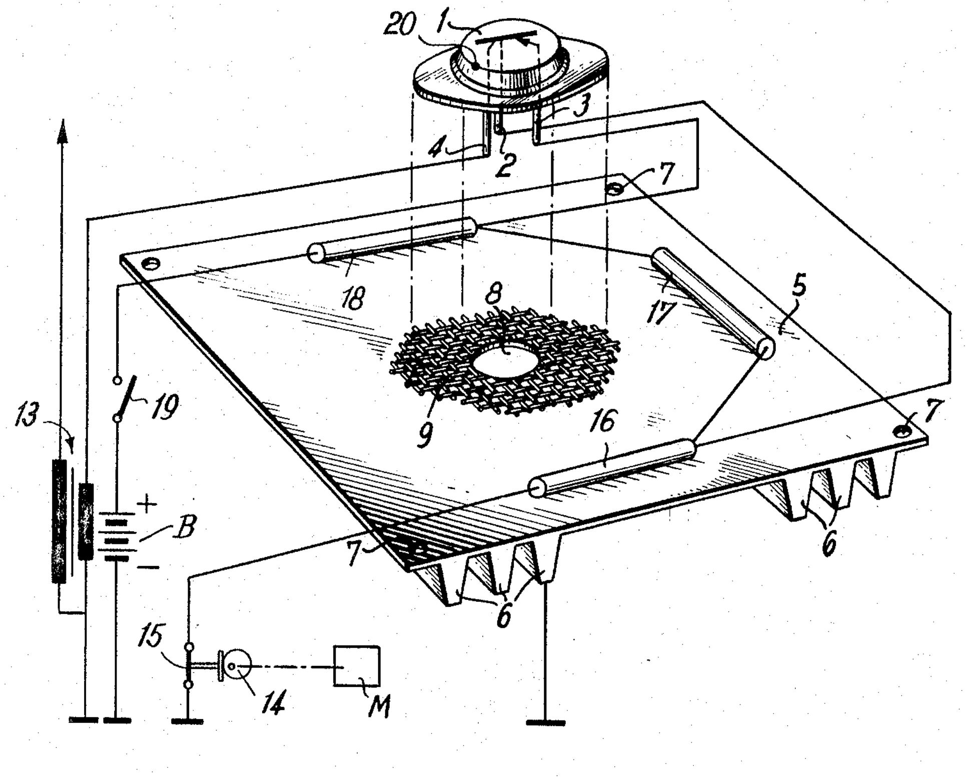
FIG. 1 is a perspective partly exploded view of a support arrangement according to the present invention in which net-like element is used as a spacer, and FIG. 1 schematically shows also the connection of the transistor into an ignition circuit of a combustion engine.

Referring now to the drawings, and more specifically to FIG. 1, it will be seen that the support arrangement of the present invention illustrated in FIG. 1 in partly exploded view and partly in a schematic manner, comprises a semiconductor shown in FIG. 1 as a transistor in the form as used in transistorized ignition circuits for combustion engines of motor vehicles. The electrode system which comprises a base, an emitter and a collector is housed in a capsule 1 from which the connectors 2, 3 and 4 for the base, the emitter and the collector project in an insulated manner. The capsule 1 which has the main function to dissipate the heat from the collector and which during operation of the transistor heats up to a considerable extent, is formed from a metal of high heat conductive capacity, and the capsule which is in direct contact with the collector has during operation of the transistor the collector potential. When the capsule of the transistor is mounted on a support element 5, which serves to support the capsule and to conduct the heat therefrom, it is therefore necessary to provide between capsule 1 and support element 5 a perfect electrical insulation while assuring at the same time a very good heat transmission between these two elements. As shown in FIG. 1, the support element 5 may be constituted by a plate of electrically conductive material which has at the bottom surface thereof a plurality of cooling ribs 6 projecting therefrom and which is provided at the corners thereof with bores 7 serving to fasten the support element or plate 5 in proper position on or adjacent the combustion engine of a motor car, for instance.

FIG. 1 illustrates also schematically the transistor incorporated into the ignition circuit of a combustion engine, in which the interruption of the primary circuit of the ignition spool 13 is produced by the emitter-collector gap of the transistor 1. The interrupter 15 controlled in known manner by a cam 14 driven from the combustion engine M is in this case only charged by the relatively low base current of the transistor 1 so that the interrupter 15 may be constructed for a low interrupter load.

The actual ignition occurs at the moment the interrupter 15 is opened by the cam 14 which is operated from the combustion engine M. The negative potential on the base of the transistor 1 falls away, at this moment and therewith the control current flowing over the base resistor 16 which produces the switched on condition of the transistor 1. The base receives then over the base-emitter resistance 17, the collector resistance 18 and the ignition switch 19, which is closed during the operation, a positive potential from the battery B, whereby the blocking condition of the transistor is initiated and retained until the interrupter 15 is closed again. The primary circuit of the ignition spool 13 is interrupted due to the blocking condition of the transistor 1 and this causes a high tension impulse in the secondary winding of the spool 13 which is transmitted to the spark plug to cause ignition of the fuel-air mixture in the combustion engine. The switch load which is to be controlled by the transistor 1 causes considerable heating up of the collector thereof for which reason the collector is connected to the capsule housing the transistor and the capsule is formed from a metal of high heat conductive capacity. The collector is also in electrical connection, as indicated at the point 20 in FIG. 1, with the capsule of the transistor. The collector and the capsule of the transistor 1 connected to the primary winding of the ignition spool has a positive potential, whereas the support plate 5 is grounded and therefore the capsule of the transistor 1 has to be electrically insulated from the support element 5, but should be connected thereto to assure proper conducting of the heat developed by the transistor during operation to the support element 5.

The proper connection of the capsule 1 of the transistor to the upper surface of the support plate 5 while electrically insulating the two members from each other, and simultaneously assuring a perfect heat transmission between capsule 1 and support member 5, is accomplished according to the present invention by sandwiching a plurality of spacer members of electrically insulating material between the bottom wall of the capsule 1 and the top surface of the support plate 5 and by connecting the spacer members, to the capsule and to the support plate by an electrically insulating adhesive. In the embodiment shown in FIG. 1, the spacer members are constituted by a layer of net-like interwoven threads 9 arranged about the opening 8 in the plate 5 through which the connector elements 2, 3 and 4 of the transistor 1 extend in the assembled position of the transistor. The electrically insulating adhesive which connects the thread-like elements to the upper surface of the plate 5 and to the bottom wall of the transistor and which fills all open spaces between the aforementioned elements is preferably a synthetic resin, for instance, an adhesive having a phenol resin base, a polyamide resin base, a polyester resin base, or the like. Suitable as adhesive for this purpose are all metal adhesives which retain even when heated a perfect adhesive capacity and which also will provide for a perfect electrical insulation.

Figure 2:
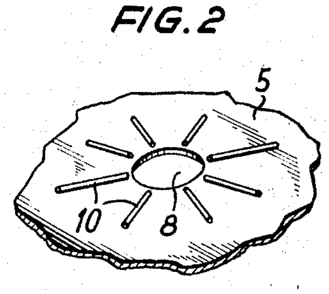
FIG. 2 is a partial, perspective view illustrating another embodiment in which thread-like spacer elements are used.
Figure 3:
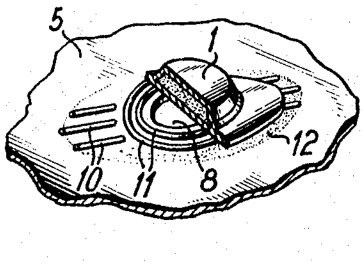
FIG. 3 is a partial perspective view similar to FIG. 2 and showing annular and straight thread-like spacer elements in a support arrangement according to the present invention.

The spacer members serve to assure that during cementing of the capsule 1 to the support element 5 metallic contact of the two members is positively avoided. The spacer members may be arranged in many different ways and instead of net-like interwoven threads are shown at 9 in FIG. 1, it is also possible to arrange short thread portions 10 of insulating material angularly spaced from each other and radially extending from the periphery of the opening 8 in the support plate 5 as shown in FIG. 2, or to arrange a plurality of thread-like members 11 in annular or spiral form about the opening 8 as shown in FIG. 3 whereby in addition thereto straight thread-like members may also be arranged radially outwardly of the annular members 11 as shown at 10 in FIG. 3. The spacer members 9, 10, 11 are preferably formed from plastic material, for instance NYLON. Favorable results as to proper electrical insulation as well as to proper heat transmission are obtained when the thickness of the spacer members 9, 10 and 11 is chosen in the order of about 0.1 mm.

Preferably, the surface 12 of the support member 5 which is covered by the spacer members 9, 10 or 11 and the adhesive is greater than the bottom wall of the capsule 1 so that the surface 12 extends beyond the outer periphery of the bottom wall of the capsule to provide an electrically insulated zone about the periphery of the capsule and to prevent thereby any flash-over or creep current between the outer periphery of the bottom wall of the capsule and the support current 5.

The arrangement according to the present invention has the advantage that heat transmission between capsule 1 and support element 5 by use of a sufficiently thin layer of adhesive is better than during use of a thin mica layer. This result is obtained by omitting with the arrangement according to the present invention any enclosure of air between the connected elements and by assuring thereby an intimate heat transmitting contact between the same.

While FIG. 1 illustrates the arrangement of the present invention incorporated into a transistorized ignition circuit of a combustion engine, it is to be understood that the that the arrangement according to the present invention can be used in all cases in which a transistor enclosed in a capsule is to be mounted on an electrically conductive support member of any shape or construction.

It will be understood that each of the elements described above, or two or more together, may also find a useful application in other types of arrangements for supporting and for conducting heat away from a semi-conductor element enclosed in a capsule of electrically conductive material differing from the type described above.

While the invention has been illustrated and described as embodied in an arrangement for supporting and for conducting heat away from a transistor enclosed in a metal capsule on a metal support element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence to the following claims.

What is claimed as new and desired to be secured by Letters Patent is:

1. In an arrangement of the character described, in combination, a semiconductor; a capsule of electrically conductive material housing said semi-conductor; a support element of electrically conductive material having a potential difference with respect to said capsule for supporting the latter and for conducting heat away therefrom; and means for securing said capsule to said support element and comprising a plurality of spacer members of electrically insulating material sandwiched between said capsule and said support element and an electrically insulating adhesive connecting said spacer members to said capsule and to said support element.

2. In an arrangement of the character described, in combination, a semi-conductor; a capsule of electrically conductive material housing said semi-conductor; a support element of electrically conductive material having a potential difference with respect to said capsule for supporting the latter and for conducting heat away therefrom; and means for securing said capsule to said support element and comprising a plurality of spacer members of electrically insulating material sandwiched between said capsule and said support element and an electrically insulating adhesive of synthetic resin connecting said spacer members to said capsule and to said support element.

3. In an arrangement of the character described, in combination, a semi-conductor; a capsule of electrically conductive material housing said semi-conductor; a support element of electrically conductive material having a potential difference with respect to said capsule for supporting the latter and for conducting heat away therefrom; and means for securing said capsule to said support element and comprising a plurality of thread-like spacer members of electrically insulating material sandwiched between said capsule and said support element and an electrically insulating adhesive connecting said spacer members to said capsule and to said support element.

4. In an arrangement of the character described, in combination, a semi-conductor; a capsule of electrically conductive material housing said semi-conductor; a support element of electrically conductive material having a potential difference with respect to said capsule for supporting the latter and for conducting heat away therefrom; and means for securing said capsule to said support element and comprising a net-like spacer member of electrically insulating material sandwiched between said capsule and said support element and an electrically insulating adhesive connecting said spacer member to said capsule and to said support element.

5. In an arrangement of the character described, in combination, a semi-conductor; a capsule of electrically conductive material housing said semi-conductor; a support element of electrically conductive material having a potential difference with respect to said capsule for supporting the latter and for conducting heat away therefrom; and means for securing said capsule to said support element and comprising a plurality of annular spacer members of electrically insulating material sandwiched between said capsule and said support element and an electrically insulating adhesive connecting said spacer members to said capsule and to said support element.

6. In an arrangement of the character described, in combination, a semi-conductor; a capsule of electrically conductive material housing said semi-conductor; a support element of electrically conductive material having a potential difference with respect to said capsule for supporting the latter and for conducting heat away therefrom; and means for securing said capsule to said support element and comprising a plurality of spacer members formed from plastic material sandwiched between said capsule and said support element and an electrically insulating adhesive connecting said spacer members to said capsule and to said support element.

7. In an arrangement of the character described, in combination, a semi-conductor; a capsule of electrically conductive material housing said semi-conductor and having a bottom wall; a support element of electrically conductive material having an end face facing said bottom wall and having a potential difference with respect to said capsule for supporting the latter and for conducting heat away therefrom; and means for securing said capsule to said support element and comprising a plurality of spacer members of insulating material sandwiched in part between said bottom wall and said end face and extending on said end face beyond said bottom wall and an insulating adhesive connecting said spacer members to said capsule and to said end face of said support element, said spacer members and said adhesive covering on said end face of said support element an area extending beyond the outer periphery of said bottom wall.

8. In an arrangement of the character described, in combination, a transistor for an ignition circuit of a combustion engine; a capsule of electrically conductive material housing said transistor and having a bottom wall through which connectors for the emitter, the base and the collector of the transistor project, a support plate of electrically conductive material having a potential difference with respect to said capsule for supporting the latter on an end face thereof and for conducting heat therefrom, said support plate being formed with an opening therethrough; and means for securing said capsule to said support plate with said connectors extending through said opening, said means comprising a plurality of spacer members of insulating material arranged about said opening and sandwiched between said bottom wall and said end face of said plate and an insulating adhesive connecting said spacer members to said bottom wall and said end face.

9. In an arrangement as set forth in claim 8, wherein said spacer members are constituted by thread portions of insulating material having inner ends adjacent said opening and projecting in substantially radial direction therefrom.

10. In an arrangement, as set forth in claim 8, wherein said spacer members are in the form of net like interwoven threads arranged about said opening.

11. In an arrangement as set forth in claim 8, wherein said spacer members are in the form of a plurality of annular thread like elements arranged about said opening substantially coaxial therewith.

12. In an arrangement as set forth in claim 11, and including further threadlike substantially straight spacer members arranged spaced from each other radially outwardly of said annular spacer elements.

13. In an arrangement as set forth in claim 8, wherein said spacer members are constituted by threads having a diameter of about 0.1 mm.

14. In an arrangement as set forth in claim 13, wherein said threads are formed from nylon.

References Cited

UNITED STATES PATENTS

D. 200,105 1/1965 Root.

FOREIGN PATENTS 1,206,000 8/1959 France.
903,613 7/1963 Great Britain.

OTHER REFERENCES

Simple Transistor Ignition, Schollmeyer, pp. 24–25, Radio Electronics, 7–1963.

LEWIS H. MYERS, *Primary Examiner.*

H. HUBERFIELD, *Assistant Examiner.*